US007422259B2

(12) United States Patent
Ban

(10) Patent No.: US 7,422,259 B2
(45) Date of Patent: Sep. 9, 2008

(54) DISPLAY SYSTEM ON MOBILE PLATFORM

(76) Inventor: Sung Wan Ban, 349 S. Lafayette Pk Pl. #317, Los Angeles, CA (US) 90057

( * ) Notice: Subject to any disclaimer, the term of this patent is extended or adjusted under 35 U.S.C. 154(b) by 0 days.

(21) Appl. No.: 11/523,470

(22) Filed: Sep. 18, 2006

(65) Prior Publication Data

US 2008/0067826 A1 Mar. 20, 2008

(51) Int. Cl.
*B60P 3/00* (2006.01)
*G09F 21/04* (2006.01)
*G09F 11/12* (2006.01)

(52) U.S. Cl. ............................ 296/21; 40/590; 40/591; 40/593; 40/524

(58) Field of Classification Search .................. 296/21; 40/590, 591, 593, 493, 344, 524, 512, 617, 40/472
See application file for complete search history.

(56) References Cited

U.S. PATENT DOCUMENTS

| | | | | | |
|---|---|---|---|---|---|
| 615,358 | A | * | 12/1898 | Lynch | 40/525 |
| 2,181,104 | A | * | 11/1939 | Moorhouse | 40/526 |
| 3,229,395 | A | * | 1/1966 | Belisle | 40/505 |
| 3,474,557 | A | * | 10/1969 | Raub, Jr. et al. | 40/472 |
| 3,849,919 | A | * | 11/1974 | Gravelle et al. | 40/472 |
| 3,972,140 | A | * | 8/1976 | Casparro | 40/470 |
| 5,181,334 | A | * | 1/1993 | Mima | 40/524 |
| 5,687,499 | A | * | 11/1997 | Brnjac | 40/524 |
| 5,918,924 | A | * | 7/1999 | Cowan | 296/21 |

* cited by examiner

*Primary Examiner*—Dennis H Pedder
(74) *Attorney, Agent, or Firm*—John K. Park; Park Law Firm

(57) ABSTRACT

A display system on mobile system includes a mobile, platform, a hanging rail, a plurality of display boards, a hanging roller device, and a spacer. The hanging rail is provided across the display space. The hanging roller device, for each of the display board, has two rollers connected with a connecting bar, a board holder fixed to the connecting bar at a first end and fixed to the top edge of the display board, and a neck portion provided at the board holder. The display system may further include a chain for connecting and tugging the display boards; a motor for tugging the chain along with the connected display boards; and a motor controller for controlling the motor.

13 Claims, 5 Drawing Sheets

DISPLAY SYSTEM ON MOBILE PLATFORM

BACKGROUND OF THE INVENTION

The present invention relates to a display system on mobile platform.

More particularly, this invention relates to a display system on mobile platform that makes the most of a relatively small space on a mobile platform for displaying commercial items or information sheets.

To display something to people, we need space or a room where the object for displaying is disposed to the line of eyesight of the people.

Even though the space seems almost infinite on the surface of the Earth, usually it is not the case. Especially in a commercially developed area, not like in a uninhabited desert, the space for displaying is not omnipresent or free of charge. Every square foot of floor is charged by a landlord, and every foot of height is charged and limited by gravity and a building regulation.

Therefore, to save or make the most of the space is not a pastime game to move around a package in a tight maze, but it asks inventors to solve a lot of mechanical and geometrical problems.

Accordingly, a need for a display system on mobile platform has been present for a long time considering the wide range of usage of display system on mobile platform. This invention is directed to solve these problems and satisfy the long-felt need.

SUMMARY OF THE INVENTION

The present invention contrives to solve the disadvantages of the prior art.

An objective of the invention is to provide a display system on mobile platform.

Another object of the invention is to provide a display system on mobile platform that saves a lot of display space.

Still another object of the invention is to provide a display system on mobile platform that moves for itself to display the items or information to spectators.

A display system on mobile system includes a mobile platform, a hanging rail, a plurality of display boards, a hanging roller device, and a spacer.

The mobile platform has a display space in which the display system is disposed. The hanging rail is provided across the display space.

The display boards, hanging down from the hanging rail, has top and bottom edges, an inner edge, an outer edge, and two or more display surfaces.

The hanging roller device, for each of the display board, has two rollers connected with a connecting bar, a board holder fixed to the connecting bar at a first end and fixed to the top edge of the display board, and a neck portion provided at the board holder.

The spacer, for keeping a predetermined distance between two neighboring display boards, has a center member and two rings connected extendably to both ends of the center member.

The display surfaces of the display board are adapted for displaying sheets and small items, and the display boards move along the hanging rail across the display space.

The predetermined distance between two neighboring display boards is adjustable according to the sheets and the small items displayed on the display surfaces to make the most of the display space.

The neck portion of the hanging roller device is fitted into the ring of the spacer substantially frictionlessly.

The mobile platform is provided on a vehicle, and the vehicle includes a trailer, a truck, a van, a sport utility vehicle, and a semi-trailer truck.

The hanging rail includes a linear portion and a circular portion. The hanging rail is closed. So, the display boards go round and round indefinitely.

The hanging rail includes a plurality of supports for supporting the hanging rail against the weight of the display boards, and the support includes a supporting leg standing on a floor of the mobile platform and a hanging girdle hanging down from a ceiling of the display platform.

The display board further includes a plurality of fixing devices on the display surfaces for fixing the sheets and the small items.

The rollers of the hanging roller device are adapted to move the display board connected to the hanging roller device along the hanging rail.

The roller of the hanging roller device includes a confining surface and a rail-gripping surface.

The confining surface is for preventing the hanging roller device from falling off the hanging rail, and the rail-gripping surface is for rolling over a top edge of the hanging rail.

The hanging roller device is adapted for the rollers roll along the hanging rail without slipping. The rollers are connected to the connecting bar rotatably.

The ring of the spacer includes a male thread, wherein the center member includes one or more female threads corresponding to the male thread, and the ring portion is retractable from the center member by screwing the ring portion along the threads.

The board holder of the hanging roller device is fixed to a location of the top edge of the display board with a predetermined distance from the inner edge of the display board, and the predetermined distance is determined by a desired distance between two neighboring display boards.

The display system may further include a chain for connecting and tugging the display boards; a motor for tugging the chain along with the connected display boards; and a motor controller for controlling the motor.

The motor controller controls operation and speed of the motor.

The display space of the mobile platform is about nineteen (19) to twenty one (21) feet long, about nine (9) to eleven (11) feet high, and about seven (7) to nine (9) feet wide.

The display board is about three (3) to four (4) feet wide and about six point five (6.5) to seven point five (7.5) feet high.

The advantages of the present invention are: (1) the display system saves a lot of space to display items and information; (2) the display system displays items and information for spectators standing in one location; and (3) the display system is fitted in a small place such as a mobile platform provided in a vehicle.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
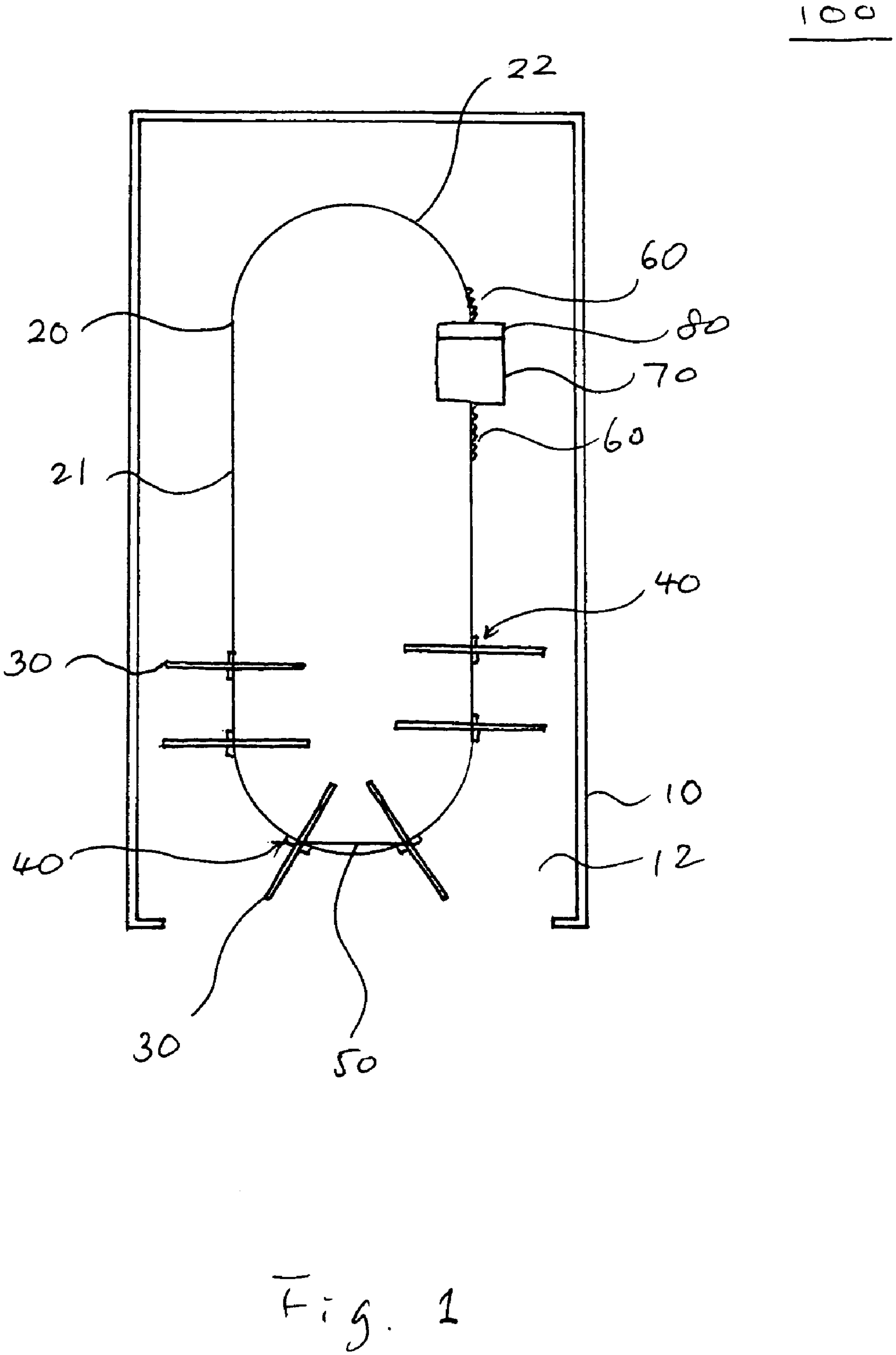
FIG. 1 is a perspective plan view showing a display system according to the invention.

FIG. 1 is perspective plan view showing a display system 100 according to the invention.

The display system 100 on mobile system includes a mobile platform 10, a hanging rail 20, a plurality of display boards 30, a hanging roller device 40, and a spacer 50.

The mobile platform 10 has a display space 12 in which the display system 100 is disposed. The hanging rail 20 is provided across the display space 12.

Figure 2:
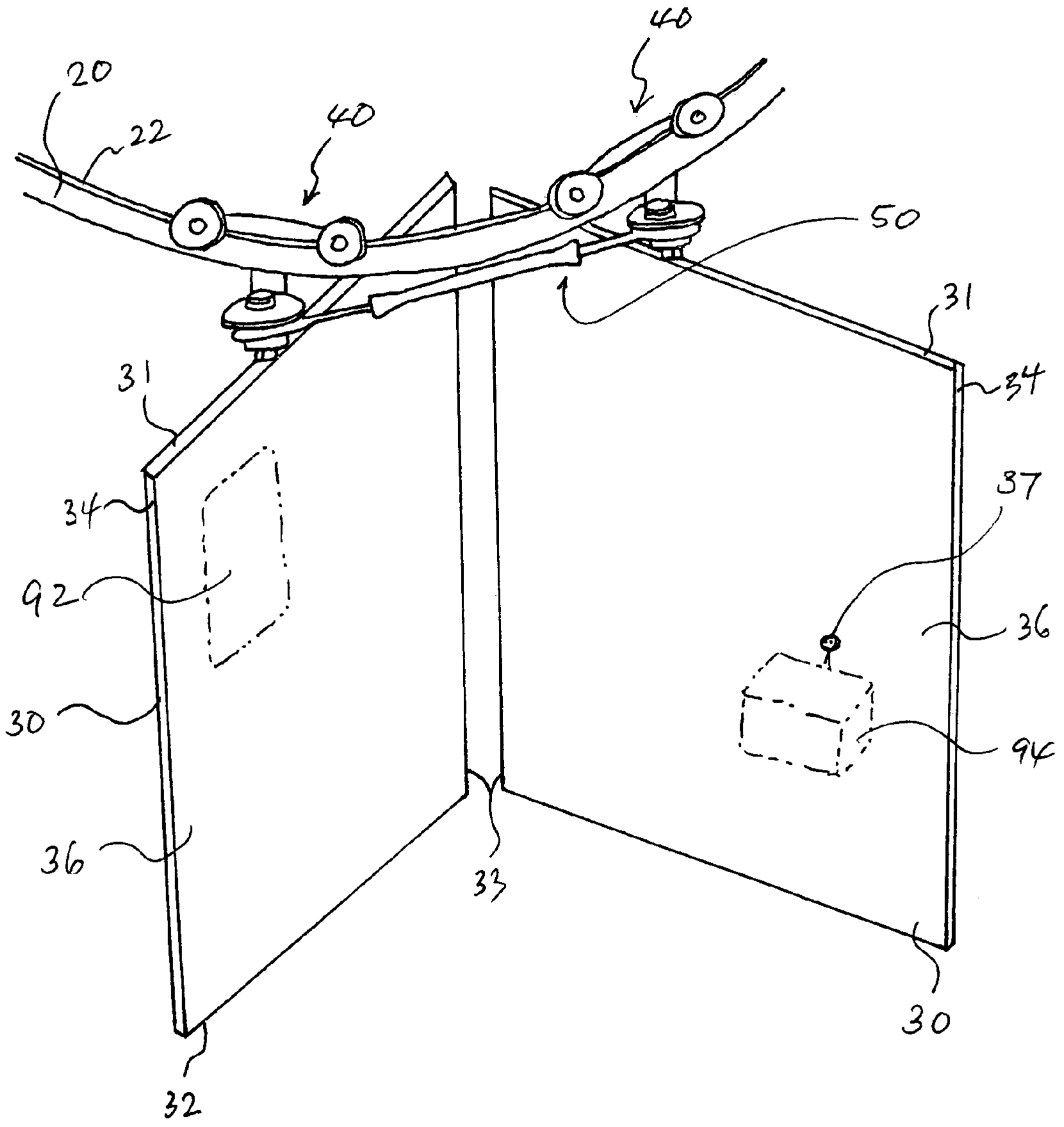
FIG. 2 is a perspective view of two display boards hanging from the hanging rail according to the invention.

The display boards 30, hanging down from the hanging rail 20, has top and bottom edges 31, 32, an inner edge 33, an outer edge 34, and two or more display surfaces 36 as shown in FIG. 2.

Figure 3:
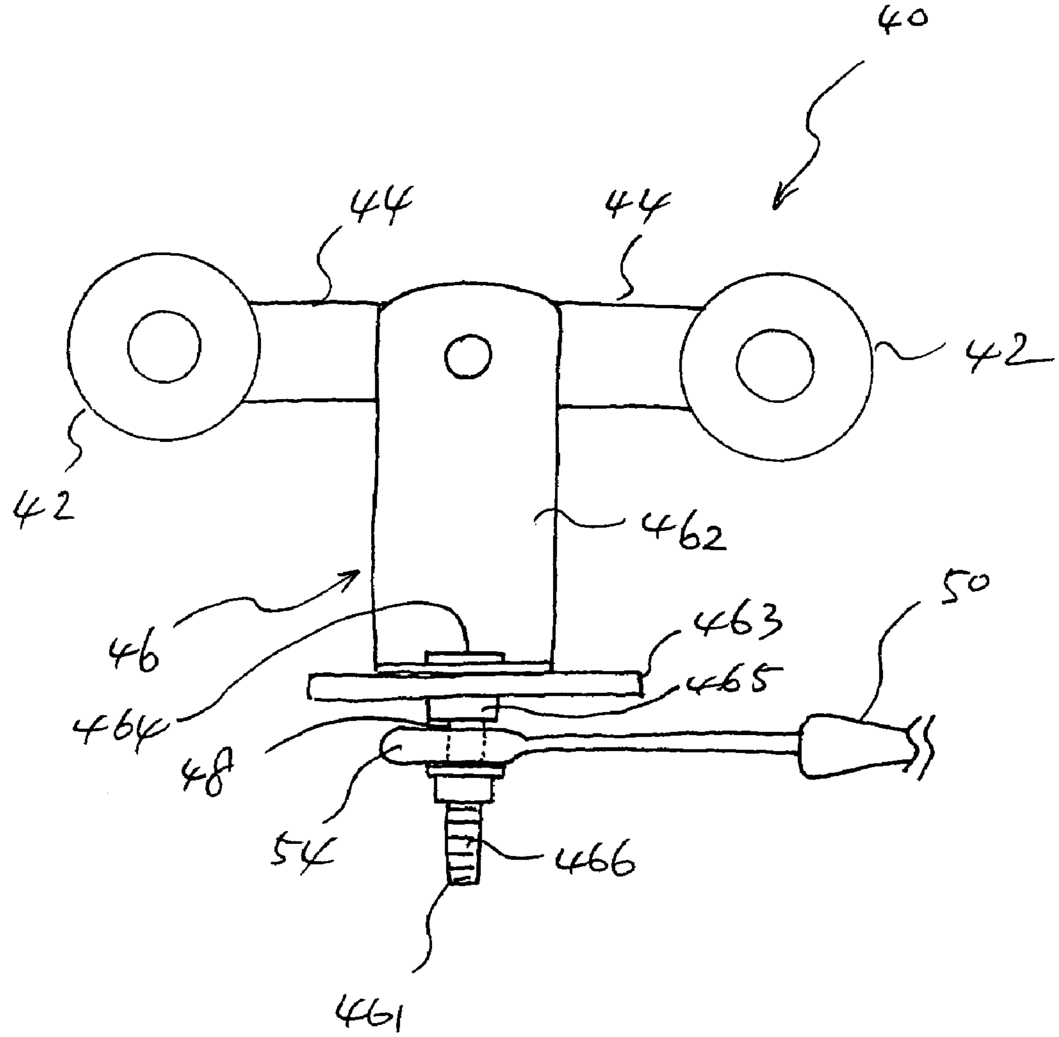
FIG. 3 is a front plan view of a hanging roller device.
Figure 4:
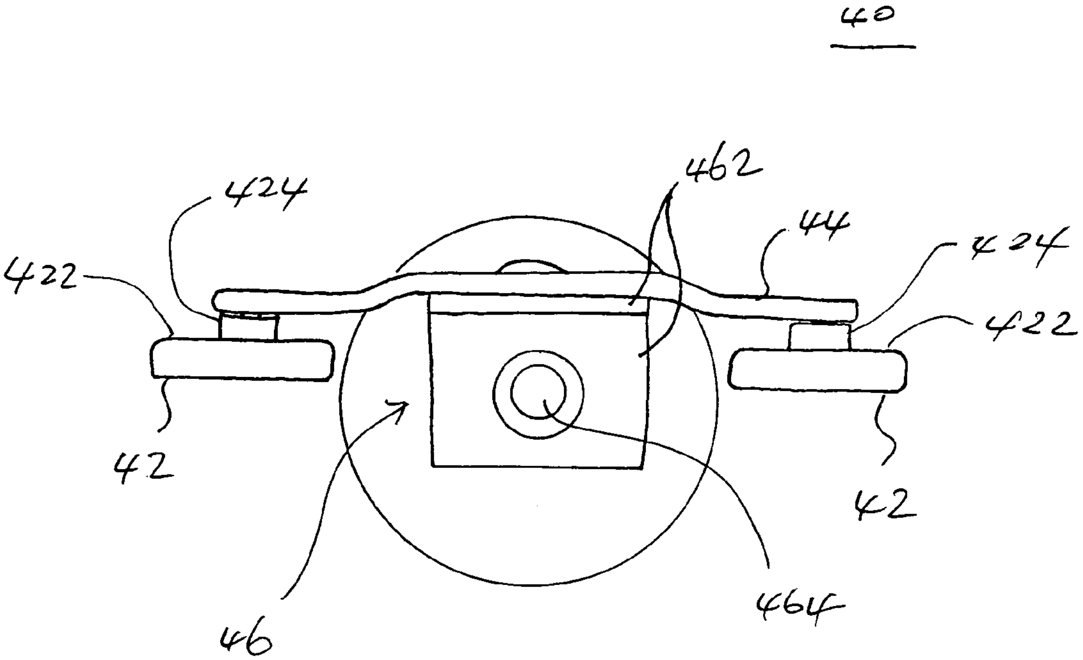
FIG. 4 is a top plan view of FIG. 3.

The hanging roller device 40, for each of the display board 30, has two rollers 42 connected with a connecting bar 44, a board holder 46 fixed to the connecting bar 44 at a first end 461 and fixed to the top edge 31 of the display board 30, and a neck portion 48 provided at the board holder 46 as shown in FIG. 3 and FIG. 4. The board holder 46 may further include a L-shaped member 462, a disc member 463, a fixing bolt 464, a fixing nut 465, and a thread 466 for the first end 461.

Figure 5:
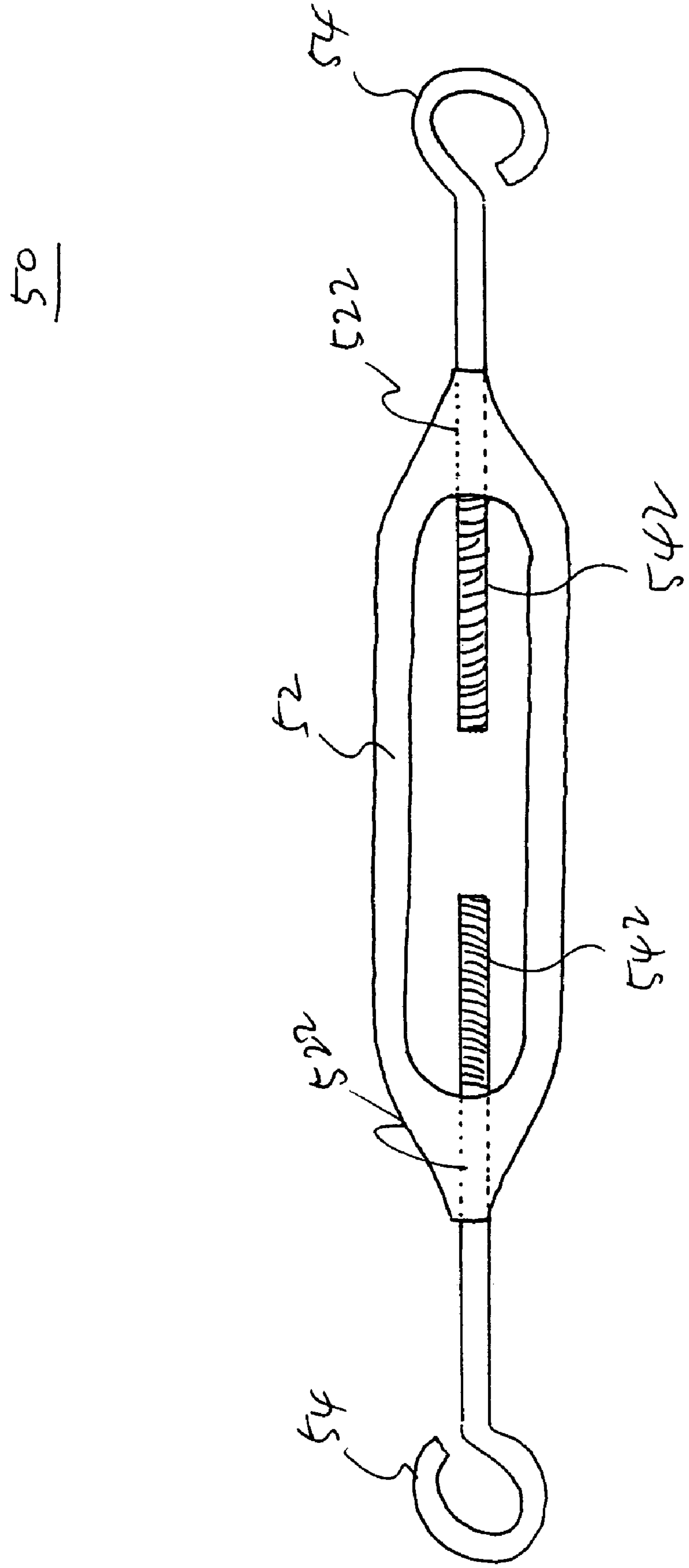
FIG. 5 is a front plan view of a spacer.

The spacer 50, for keeping a predetermined distance between two neighboring display boards 30, has a center member 52 and two rings 54 connected extendably to both ends of the center member 52 as shown in FIG. 5. The rings 54 are fitted into the neck portion 48 of the board holder 46.

The display surfaces 36 of the display board 30 are adapted for displaying sheets 92 and small items 94, and the display boards 30 move along the hanging rail 20 across the display space 12.

The predetermined distance between two neighboring display boards 30 is adjustable according to the sheets 92 and the small items 94 displayed on the display surfaces 36 to make the most of the display space 12.

The neck portion 48 of the hanging roller device 40 is fitted into the ring 52 of the spacer 50 substantially frictionlessly.

The mobile platform may be provided on a vehicle, and the vehicle includes a trailer, a truck, a van, a sport utility vehicle, and a semi-trailer truck.

The hanging rail 20 includes a linear portion 21 and a circular portion 22. The hanging rail 20 is closed. So, the display boards 30 go round and round indefinitely.

The hanging rail 20 includes a plurality of supports (not shown) for supporting the hanging rail 20 against the weight of the display boards 30, and the support includes a supporting leg (not shown) standing on a floor of the mobile platform 10 and a hanging girdle (not shown) hanging down from a ceiling of the display platform 10.

The display board 30 may further include a plurality of fixing devices 37 on the display surfaces 36 for fixing the sheets 92 and the small items 94 as shown in FIG. 2.

The rollers 42 of the hanging roller device 40 are adapted to move the display board 30 connected to the hanging roller device 40 along the hanging rail 20.

The roller 42 of the hanging roller device 40 includes a confining surface 422 and a rail-gripping surface 424 as shown in FIG. 4.

The confining surface 422 is for preventing the hanging roller device 40 from falling off the hanging rail 20, and the rail-gripping surface 424 is for rolling over a top edge 22 of the hanging rail 20.

The hanging roller device 40 is adapted for the rollers 42 roll along the hanging rail 20 without slipping. The rollers 42 are connected to the connecting bar 44 rotatably.

The ring 54 of the spacer 50 includes a male thread 542, wherein the center member 52 includes one or more female threads 522 corresponding to the male thread 542, and thus the ring portion 54 is retractable from the center member 52 by screwing the ring portion 54 along the threads 522, 542 as shown in FIG. 5, which adjusts the predetermined distance between neighboring display boards 30.

The board holder 46 of the hanging roller device 40 is fixed to a location of the top edge 31 of the display board 30 with a predetermined distance from the inner edge 33 of the display board 30, and the predetermined distance is determined by a desired distance between two neighboring display boards 30.

The display system 100 may further include a chain 60 for connecting and tugging the display boards 30; a motor 70 for tugging the chain 60 along with the connected display boards 30; and a motor controller 80 for controlling the operation of the motor 70. The chain 60 is connected to the display boards 30, and is supported by a support (not shown) fixed to the hanging rail 20.

The motor controller 80 controls operation and speed of the motor 70.

The display space 12 of the mobile platform 10 is about nineteen (19) to twenty one (21) feet long, about nine (9) to eleven (11) feet high, and about seven (7) to nine (9) feet wide.

The display board 30 is about three (3) to four (4) feet wide and about six point five (6.5) to seven point five (7.5) feet high.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A display system on mobile system comprising:

a) a mobile platform having a display space;

b) a hanging rail provided across the display space;

c) a plurality of display boards, hanging down from the hanging rail, having top and bottom edges, an inner edge, an outer edge, and two or more display surfaces;

d) a hanging roller device, for each of the display board, having two rollers connected with a connecting bar, a board holder fixed to the connecting bar at a first end and fixed to the top edge of the display board, and a neck portion provided at the board holder; and e) a spacer, for keeping a predetermined distance between two neighboring display boards, having a center member and two rings connected extendably to both ends of the center member, wherein the display surfaces of the display board are adapted for displaying sheets and small items, wherein the display boards move along the hanging rail across the display space, wherein the predetermined distance between two neighboring display boards is adjustable according to the sheets and the small items displayed on the display surfaces to make the most of the display space, wherein the neck portion of the hanging roller device is fitted into one of the two rings of the spacer substantially frictionlessly.

2. The display system of claim 1,
wherein the mobile platform is provided on a vehicle,
wherein the vehicle is selected from a group consisting of a trailer, a truck, a van, a sport utility vehicle, and a semitrailer truck.

3. The display system of claim 1, wherein the hanging rail comprises a linear portion and a circular portion.

4. The display system of claim 3, wherein the hanging rail is closed.

5. The display system of claim 1, wherein the display board further comprises a plurality of fixing devices on the display surfaces for fixing the sheets and the small items.

6. The display system of claim 1,
wherein the rollers of the hanging roller device are adapted to move the display board connected to the hanging roller device along the hanging rail.

7. The display system of claim 1, wherein the roller of the hanging roller device comprises:
a) a confining surface for preventing the hanging roller device from falling off the hanging rail; and
b) a railgripping surface for rolling over a top edge of the hanging rail.

8. The display system of claim 7, wherein the rollers are connected to the connecting bar rotatably.

9. The display system of claim 1, wherein one of the two rings of the spacer comprises a male thread, wherein the center member comprises one or more female threads corresponding to the male thread, wherein the ring portion is retractable from the center member by screwing the ring portion along the threads.

10. The display system of claim 1, wherein the board holder of the hanging roller device is fixed to a location of the top edge of the display board with a predetermined distance from the inner edge of the display board, wherein the predetermined distance is determined by a desired distance between two neighboring display boards.

11. The display system of claim 1, further comprising:
a) a chain for connecting and tugging the display boards;
b) a motor for tugging the chain along with the connected display boards; and
c) a motor controller for controlling the motor, wherein the motor controller controls operation and speed of the motor.

12. The display system of claim 11, wherein the display space of the mobile platform is nineteen (19) to twenty one (21) feet long, nine (9) to eleven (11) feet high, and seven (7) to nine (9) feet wide.

13. The display system of claim 12, wherein the display board is three (3) to four (4) feet wide and six point five (6.5) to seven point five (7.5) feet high.

* * * * *